United States Patent
Keberle et al.

[15] 3,686,387
[45] Aug. 22, 1972

[54] PRODUCTION OF ELASTIC POLYURETHANE FILAMENTS

[72] Inventors: Wolfgang Keberle, Leverkusen; Heinz Hornig, Cologne; Gustav Sinn, Opladen, all of Germany

[73] Assignee: Farbenfabriken Bayer Aktiengesellschaft, Leverkusen, Germany

[22] Filed: Aug. 10, 1970

[21] Appl. No.: 62,644

[30] Foreign Application Priority Data

March 10, 1967 Germany...................F 51780

[52] U.S. Cl...........264/184, 260/29.4, 260/77.5 QU, 264/203
[51] Int. Cl..............................................D01f 7/00
[58] Field of Search......260/77.5 QU, 29.4, 29.2 TN; 264/184, 203

[56] References Cited

UNITED STATES PATENTS

| | | |
|---|---|---|
| 3,384,606 | 5/1968 | Dieterich et al....260/29.2 TN |
| 3,388,087 | 6/1968 | Dieterich et al. ...266/77.5 QU |
| 3,395,129 | 7/1968 | Dieterich et al. ...266/77.5 QU |
| 3,410,817 | 11/1968 | McClellan et al...260/29.2 TN |
| 3,438,940 | 4/1969 | Kebeler et al. .....260/29.2 TN |
| 3,461,103 | 8/1969 | Kebeler et al. .....260/29.2 TN |
| 3,479,310 | 11/1969 | Dieterich et al. ..........260/29.4 |
| 3,491,050 | 1/1970 | Kebeler et al......260/77.5 QU |
| 3,536,668 | 10/1970 | Wieden et al..............264/184 |
| 3,539,483 | 11/1970 | Kebeler et al......260/29.4 QA |
| 3,401,151 | 9/1968 | Wieden et al. .....260/29.6 TN |

FOREIGN PATENTS OR APPLICATIONS 1,058,339  2/1967  Great Britain.....260/77.5 QU

*Primary Examiner*—Jay H. Woo
*Attorney*—Plumley, Tynes and Sandt

[57] ABSTRACT

Elastic filaments are prepared from emulsifier-free dispersions of segmented polyurethane polymers containing salt groups by spinning the dispersions into aqueous precipitation baths.

12 Claims, No Drawings

PRODUCTION OF ELASTIC POLYURETHANE FILAMENTS

This application is a continuation of Ser. No. 708,786 filed Feb. 28, 1968, now abandoned.

This invention relates to the production of elastic polyurethane filaments and to a method of preparation. More particularly it relates to a process for the production of elastic polyurethane filaments from aqueous dispersions of elastic polyurethane elastomers produced by the isocyanate polyaddition process, by spinning the said elastomers into an aqueous precipitating bath.

Various processes are known from the technology and chemistry of rubber filaments for producing elastic filaments, which processes are based on the coagulation of latices and dispersions of natural and synthetic polymers and copolymers. In these processes, the natural or synthetic rubber latices which contain vulcanization agents are spun through nozzles into aqueous precipitating baths which contain monovalent or polyvalent salts of organic and inorganic acids. The latex filament leaving the nozzle is immediately coagulated to form a circular filament. The resulting coagulated filament is then dried and cross-linked.

In addition, polyurethane filaments may be produced by known processes by spinning from organic solutions. This method of producing polyurethane filaments is the basis of many different processes.

In an earlier process, cross-linked polyurethanes are dissolved in highly polar solvents, such as, for example, dimethylformamide, and worked up into filaments by injecting their solutions into a precipitation bath such as water. A disadvantage of this process is that it is not sufficiently reproducible. In more recent processes, suitable prepolymers of higher molecular weight compounds such as polyether or polyesters and diisocyanates are reacted in highly polar solvents, such as, for example, dimethylformamide or dimethylsulphoxide, with diamines or hydrazine to form a linear polyurethane, and this is worked up into elastic filaments by spinning processes similar to those used for polyacrylonitrile or acetate fibers. It is also possible to spin such elastomer solutions in water by the wet spinning process. According to another process, the prepolymers which contain isocyanate end groups and are prepared from higher molecular weight hydroxyl compounds and polyisocyanates are spun through nozzles into an aqueous bath which contains a highly reactive diprimary or disecondary aliphatic diamine. The freshly spun filament is then hardened by treating it with hot water. Such spinning baths may also contain, in addition to diamines slowly reacting cross-linking agents such as polyfunctional alcohols. Hardening the filament can then be effected by subsequent exposure to heat. It is also known to carry out the reaction of the isocyanate-containing prepolymer with the diamine by a two-stage process in which the diamines are used in less than the stoichiometric quantity corresponding to the isocyanate groups of the prepolymer, and the resulting prepolymer which still contains isocyanate groups is extruded in organic solution into a water bath which contains an excess of diamine. The reaction of a prepolymer may also be carried out with more than stoichiometric quantities of diamines or similar chain lengthening agents. The viscosity is then adjusted by a separate addition of polyisocyanates to the elastomer solution which is then spun by one of the usual spinning processes. All these processes necessitate a large expenditure on equipment. The reproduction of the required mechanical properties also entails difficulties. It is also a disadvantage of many of the processes that they involve the use of solvents that are combustible and not without physiological action.

It is therefore an object of this invention to provide improved polyurethane filaments. It is another object to provide an improved method of preparing polyurethane filaments. It is a further object to provide emulsifier-free, aqueous dispersions of polyurethane polymers that contain salt groups and are capable of being spun into filaments.

The foregoing objects and others that become apparent from the following description are accomplished in accordance with the invention, generally speaking, by providing elastic filaments from segmented polyurethane elastomers by spinning emulsifier-free, aqueous dispersions of polyurethanes which contain salt groups into an aqueous precipitation bath. These segmented polyurethane elastomers are produced by reacting higher molecular weight, substantially linear polyhydroxyl compounds that have molecular weights of 500 to 10,000, preferably 750 to 3,000, with polyisocyanates and chain lengthening agents. Dimensionally stable filaments are obtained which after drying and cross-linking have good mechanical and elastic properties.

The filaments obtained can be cross-linked by known procedures. It is advantageous to employ the conventional machines and apparatus used in the rubber filament industry and to adapt the production of the polyurethane filaments to the conventional technology employed in the rubber filament industry for the production of rubber filaments. This makes possible the obtaining of polyurethane filaments without the use of physiologically harmful and combustible solvent or the necessity for complicated apparatus.

In the process according to the invention only those polyurethane dispersions which have been prepared without emulsifiers may be used, the segmented polyurethanes suitable for the process being synthesized with the aid of chain lengthening agents which carry salt groups. The elastic filaments are obtained from the emulsifier-free dispersions by shaping them by passage through a nozzle and spinning them into an aqueous precipitation bath.

The possibility of spinning aqueous dispersions of polyurethanes by coagulation in precipitation baths in such a manner that a homogeneous phase is formed was not to be expected in the case of these polyurethane dispersions which contain salt groups and which are in some cases highly compatible with electrolytes. It has been found that the only polyurethane compositions suitable for the production of filaments were those which were non-sticky and not too soft. It is preferred to use polyurethanes of which the Shore hardnesses A are in the region of 40 to 90 hardness degrees. Polyurethanes that are too hard result in filaments that are brittle in the wet gel state, break under bending stresses and have only limited elasticity and flexibility. The dispersions to be used according to the invention are finely divided, mechanically stable and can be precipitated by electrolytes. If desired, compounds that accelerate precipitation may be added. Dispersions of polyurethane compositions which have a low salt group content and in which the salt group are carboxylate groups are particularly easy to precipitate.

Suitable higher molecular weight polyhydroxyl compounds are especially those with a molecular weight of 500 to 10,000, preferably 750 to 3,000. Such compounds include for example, polyesters, polyethers, polyacetals and polyester amides. The hydroxyl number of these compounds is about 11 to 220, especially 40 to 150.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethylcyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like.

Any suitable amino alcohol such as, for example, b-hydroxy ethyl-amine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenyl propane 4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257–262, published by Interscience Publishers in 1951 or in U.S. Pat. No. 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfide, 1,4-(b-hydroxy ethyl) phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

Any suitable organic diisocyanate may be used in reaction with the organic compound containing active hydrogen atoms such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-toluylene diisocyanate, 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred to use aliphatic diisocyanates to obtain polyurethane compositions that will not discolor in the light.

To vary the hardness of all of the filaments, any suitable chain extending agent containing active hydrogen atoms which are reactive with NCO groups and having a molecular weight less than about 300 may be used such as, for example, ethylene glycol, propylene glycol, butylene glycol, 1,4-butanediol, butenediol, butynediol, xylylene glycol, neopentyl glycol, 2,3-butanediol, 1,4-phenylene-bis-(b-hydroxy ethyl ether), 1,3-phenylene-bis-(b-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene-bis(2-chloroaniline), 3,3-dichloro-4,4'-biphenyl diamine, 2,6-diamino pyridine, 4,4'-diamino diphenyl methane, and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-capronic acid dihydrazide, gamma-hydroxy butyric hydrazide, bis-semi-carbazide, bis-hydrazine carbonic esters of glycols such as any of the glycols heretofore mentioned and the like.

For the production of polyurethanes that are suitable for sulphur vulcanization, chain lengthening agents which contain olefinically unsaturated double bonds are used, for example allyl glycerol ethers.

The dispersed polyurethanes which are free from emulsifier contain a small amount of built in salt-type groups which have an emulsifying function and enable dispersion to take place without the use of emulsifiers. Dispersions of segmented polyurethane elastomers with salt-type groups suitable for the formation of filaments can be produced, for example, by the process of Belgian Pat. specification No. 673,432 or French Pat. specification No. 1,416,463 by including in the preparation chain lengthening agents which carry salt-type groups. Chain lengthening agents of this kind are bifunctional compounds, i.e., compounds which have two groups which will react with isocyanate groups, especially amino groups, and additionally at least one salt group. Such salt groups can be for example carboxylate-, sulphonate-, phosphate-, sulfate-, phosphonate or phosphinate groups or quaternary ammonium groups, ternary thioether groups, and phosphonium groups. Examples of such compounds are the alkali metal salts or the ammonium salts of aliphatic and aromatic diaminocarboxylic acids and diaminosulphonic acids. The alkali metal salts and ammonium salts of aliphatic diamino acids such as lysine and ornithine and the (1:1)-addition products of propane sultone and butane sultone with aliphatic diamines such as ethylene diamine and 1,6-diaminohexane are preferred. The addition products of the alkali metal salts or ammonium salts of unsaturated aliphatic acids such as acrylic acid, methacrylic acid, maleic acid or vinyl sulphonic acid or styrene sulphonic acid with ethylene diamine, 1,6-diaminohexane, hydrazine or 4,4'-diaminodicyclohexylmethane are also suitable.

Dispersions suitable for the production of filaments are of the kind in which the dispersed polyurethanes have a salt group content, for example a carboxylate, sulphonate, phosphate or quaternary ammonium group content, of 0.1 to 3 percent by weight, preferably 0.5 to 2 percent by weight, based on the polyurethanes.

In the production of emulsifier-free polyurethane dispersions, a prepolymer containing isocyanate end groups is usually first prepared, preferably in the melt, from the higher molecular weight polyhydroxyl compound of molecular weight 750 to 3,000 and diisocyanates. The prepolymer is then taken up in an organic solvent and reacted with a chain lengthening agent containing salt-type groups so that the size of the molecule is increased, and it is then dispersed in water. Low boiling solvents may then be removed from the dispersion by distillation.

The solids content of the dispersions can be adjusted as desired. Preferably solvent-free dispersions that have a solids content of over 40 percent are used for the production of the filaments.

For the production of emulsifier-containing polyurethane dispersions that are free from salt groups utilizing known processes, see, for example German Auslegeschrift 1,097,678, U.S. Pat. specification No. 2,968,575 and Belgian Pat. specification No. 663,102, the use of emulsifiers is essential. If, for the sake of comparison, emulsifier-containing dispersions prepared by known processes are expelled under pressure through a nozzle into a precipitation bath, coagulation takes place but no filament formation.

The emulsifier-free dispersions can be produced according to the following general prescription: The polymeric diol, i.e., polyester or polyether used, is first dehydrated for 30 minutes in a water jet vacuum at 120° C and then reacted with the polyisocyanate. If aliphatic diisocyanates are used, the prepolymer is prepared at temperatures of about 120° C. If aromatic diisocyanates are used, temperatures of 70° to 90° C are generally sufficient. After cooling to 50° C, the melt is taken up in acetone so that an approximately 35 to 50 percent by weight acetonic solution results. The prepolymer solution is now treated with an aqueous solution of the chain lengthening agent which contains the acid group in the form of an alkali metal salt, amine salt or ammonium salt. After termination of the reaction, the calculated quantity of water required for the desired solids content of the dispersion to be produced is added and the acetone is distilled off in a water jet vacuum at 50° to 55° C.

If cross-linking agents are employed, they may be added to the acetone during the preparation of the dispersion or to the water or after the preparation to the finished dispersion.

Suitable compounds for use as cross-linking agents include, for example, formaldehyde, compounds which split off formaldehyde or compounds which react like formaldehyde, such as reaction products of melamine, urea and other carbamic acids compounds with formaldehyde which products may be etherified.

The filaments can be vulcanized by simply afterheating them at 100° to 160° C, preferably 120° to 140° C, if desired in the presence of acids or compounds which split off acid. The hardness, elasticity, tensile strength, permanent elongation and swelling properties of the filaments can be varied in the subsequent vulcanization.

The dispersions can generally be used direct for the production of filaments by pressing said dispersions (latices) through a spinning nozzle having capillary holes into a precipitation bath containing an aqueous salt solution. In case of using a divalent or trivalent metal salt such as calcium chloride, aluminum chloride or magnesium sulfate the filaments become cross-linked and insoluble in dimethyl formamide without addition of a cross-linking agent such as formaldehyde or a melamin resin. In some cases, it is advisable to filter them through a metal screen or perlon fabric in order to remove coarse particles which are liable to block the nozzle.

The invention will be further illustrated by the following examples in which parts are by weight unless otherwise specified.

EXAMPLE 1

About 250 parts of a polyester of adipic acid and ethylene glycol (OH number 56) are dehydrated in a water jet vacuum for about 30 minutes at about 120° C, and about 38 parts of 1,6-hexanediisocyanate are then added at about 100° C. After a reaction time of about 2 hours at about 110° to about 120° C, the prepolymer is cooled and taken up in about 700 parts by volume of acetone. About 11.5 parts of potassium lysinate in about 80 parts by volume of water are added to the acetonic solution of prepolymer which is at a temperature of about 50° C. After completion of the reaction, about 450 parts by volume of water are added with rapid stirring until the reaction mixture has become homogeneous. The acetone is then distilled off in a water jet vacuum at about 50° C. The 40.8 percent dispersion obtained has a residual acetone content of 0.5 percent.

To produce filaments, about 2 parts of a 50 percent aqueous solution of hexamethylolmelamine hexamethyl ether, about 10 parts of a 10 percent aqueous ammonium chloride solution and about 2 parts of titanium dioxide dispersed in about 4 parts of a 5 percent aqueous solution of a condensation product of naphthalene sulphonic acid sodium and formaldehyde are added to about 245 parts of the dispersion (corresponding to about 100 parts of dry polyurethane substance). This mixture is homogenized and and the dispersion (latex) is pressed through a spinning nozzle into a precipitation bath which contains a 20 percent calcium chloride solution to form the filament. The coagulated filament is withdrawn moist over a draw-off-device, washed, dried at 80° to 90° C and then cross-linked at about 140° C. The following mechanical values were determined on the resulting filament:

| | |
|---|---|
| Tensile strength | 4.29 kg/mm$^2$ |
| Elongation at break | 570% |
| Permanent elongation | 45% |
| Hardness (Shore A) | 71 |

EXAMPLE 2

A 43 percent aqueous dispersion was prepared in the manner described in Example 1 from a polyurethane made from about 212.5 parts of the polyester of adipic acid and 1,6-hexanediol (OH number 132), about 61.5 parts of 1,6-hexanediisocyanate and about 10.6 parts of sodium lysinate.

The quantities of melamine resin, ammonium chloride and titanium dioxide indicated in Example 1 are added to about 233 parts of the dispersion (corresponding to 100 parts of dry polyurethane). The filaments obtained from the mixture have the following mechanical properties:

| | |
|---|---|
| Tensile strength | 3.8 kg/mm$^2$ |
| Elongation at break | 405% |
| Permanent elongation | 155% |
| Hardness (Shore A) | 86 |

EXAMPLE 3

The prepolymer prepared at about 120° C from about 271 parts of the polyester of adipic acid and ethylene glycol (OH number 51.7) and about 36.8 parts of 1,6-hexanediisocyanate is taken up in about 700 parts by volume of acetone, and a mixture of about 1.9 parts of ethylene diamine, about 3.8 parts of propane sultone and about 17.5 parts of 10 percent aqueous potassium hydroxide in about 50 parts by volume of water is added at about 50° C. About 450 parts by volume of water are then introduced and the acetone is distilled off.

The quantities of melamine resin, ammonium chloride and titanium dioxide indicated in Example 1 are added to about 250 parts of the 40 percent dispersion. The filaments obtained from the mixture have the following mechanical properties:

| | |
|---|---|
| Tensile strength | 3.5 kg/mm$^2$ |
| Elongation at break | 580% |
| Permanent elongation | 9% |
| Hardness (Shore A) | 70 |

EXAMPLE 4

The quantities of melamine resin, ammonium chloride and titanium dioxide indicated in the above Examples are incorporated with about 233 parts of a 43 percent dispersion (corresponding to about 100 parts of dry polyurethane) prepared in the manner described in detail in Example 1 from about 212.4 parts of the polyester of adipic acid, 1,6-hexanediol and neopentyl glycol (molar ratio 30:22:12; OH number 67), about 36 parts of 1,6-hexane-diisocyanate and about 11.5 parts of potassium lysinate. The filaments obtained from the dispersion by spinning it into an aqueous 20 percent calcium chloride solution have the following mechanical properties:

| | |
|---|---|
| Tensile strength | 1.4 kg/mm$^2$ |
| Elongation at break | 530% |
| Permanent elongation | 9% |
| Hardness (Shore A) | 66 |

EXAMPLE 5

The quantities of melamine resin, ammonium chloride and titanium dioxide indicated in the above examples are incorporated in about 255 parts of a 39.3 percent dispersion (corresponding to about 100 parts of dry polyurethane) prepared as described in detail in Example 1 from about 212 parts of the polyester of adipic acid, phthalic acid and ethylene glycol (molar ratio 4.5:1.5:7.1; OH number 67), about 38 parts of 1,6-hexanediisocyanate and about 11.5 parts of potassium lysinate. The filaments obtained from the dispersion have the following mechanical properties:

| | |
|---|---|
| Tensile strength | 3.6 kg/mm$^2$ |
| Elongation at break | 605% |
| Permanent elongation | 8% |
| Hardness (Shore A) | 60 |

EXAMPLE 6

About 2 parts of titanium dioxide dispersed in about 4 parts of a 5 percent aqueous solution of a condensation product of naphthalene sulphonic acid sodium and formaldehyde are stirred into about 255 parts of the dispersion described in Example 5 which has a solids content of 39.3 percent (corresponding to about 100 parts of dry polyurethane). The mixture is injected through a capillary tube into a 20 percent aqueous calcium chloride solution. The coagulated filament is drawn off moist over a draw-off device, washed, preliminarily dried at 80° to 90° C and then tempered at about 140° C. The filament is insoluble in dimethyl formamide (cross-linked by calcium chloride). The mechanical properties of the filament are as follows:

| Tensile strength | 3.4 kg/mm$^2$ |
| --- | --- |
| Elongation at break | 620% |
| Permanent elongation | 9% |
| Hardness (Shore A) | 57 |

EXAMPLE 7

About 2 parts of titanium dioxide dispersed in about 4 parts of a 5 percent aqueous solution of a condensation product of naphthalene sulphonic acid sodium and formaldehyde are stirred into about 258 parts of a 38.8 percent dispersion (corresponding to about 100 parts of dry polyurethane) prepared as described in Example 1 from about 266 parts of poly-1,4-butylene glycol ether (OH number 52.5), about 38 parts of 1,6-hexanediisocyanate and about 11.3 parts of potassium lysinate. The mixture is spun into a 20 percent aqueous calcium chloride solution through a capillary tube. The coagulated filament is drawn off, washed in distilled water, dried at 80° to 90° and then tempered at 140° C. The resulting filaments have the following mechanical properties:

| Tensile strength | 2 kg/mm$^2$ |
| --- | --- |
| Elongation at break | 450% |
| Permanent elongation | 10% |
| Hardness (Shore A) | 65 |

It is to be understood that any of the polymeric glycols, organic polyisocyanates, chain extending agents containing salt groups, crosslinking agents and the like may be substituted into the examples in like amounts for those used therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

We claim:

1. The process of preparing segmented polyurethane filaments which comprises spinning an emulsifier-free, aqueous dispersion of a polyurethane polymer containing salt groups into an aqueous precipitating bath, said polyurethane polymer obtained by (a) reacting an excess of an organic dissocyanate with polymeric diol having a molecular weight of from about 500 to about 10,000 and (b) reacting the product of (a) with a chain extending agent containing salt groups; said salt groups being selected from alkali metal carboxylate groups, ammonium carboxylate groups, alkali metal sulfonate groups, ammonium sulfonate groups, alkali metal phosphonate groups, ammonium phosphonate groups and quaternary ammonium groups.

2. The process of claim 1 wherein the polyurethane polymer contains 0.1 to 3 percent by weight of salt groups based on the polyurethane polymer.

3. The process of claim 1 wherein the salt group is selected from alkali metal carboxylate groups, ammonium carboxylate groups, alkali metal sulfonate groups, and ammonium sulfonate groups.

4. The process of claim 1 wherein the salt group is an alkali metal carboxylate.

5. The process of claim 1 wherein a cross-linking agent is added to the aqueous dispersion of a polyurethane polymer.

6. The process of claim 1 wherein the chain extending agent is an alkali metal lysinate.

7. The process of claim 1 wherein the chain extending agent is a 1:1-addition product of an alkyl sultone with an alkylene diamine.

8. The process of preparing segmented polyurethane filaments which comprises spinning an emulsifier-free aqueous dispersion of a polyurethane polymer into an aqueous precipitating bath said polyurethane polymer obtained by a. reacting an excess of an organic diisocyanate with a polymeric diol having a molecular weight of from about 500 to about 10,000 and b. reacting the product of (a) with a chain-extending agent selected from the group consisting of an alkali metal salt of a diamino carboxylic acid and an alkali metal salt of a diamino sulfonic acid.

9. The process of claim 8 wherein the chain-extending agent is applied in such an amount that the polyurethane polymer contains 0.1 to 3 percent by weight of carboxylate or sulfonate groups.

10. The process of claim 8 wherein the chain-extending agent is an alkali metal lysinate.

11. The process of claim 8 wherein the chain-extending agent is a 1:1-addition product of an alkyl sultone with an alkylene diamine.

12. The process of claim 8 wherein a cross-linking agent is added to the aqueous dispersion of a polyurethane polymer.

* * * * *